(12) United States Patent
Addona

(10) Patent No.: US 6,371,626 B1
(45) Date of Patent: Apr. 16, 2002

(54) HOLE ALIGNMENT DEVICE

(76) Inventor: Anthony Addona, 244 Union St., Lawrence, NY (US) 11559

( * ) Notice: Subject to any disclaimer, the term of this patent is extended or adjusted under 35 U.S.C. 154(b) by 0 days.

(21) Appl. No.: 09/697,976

(22) Filed: Oct. 26, 2000

(51) Int. Cl.[7] .................................................. F21K 7/00
(52) U.S. Cl. ...................... 362/259; 362/109; 362/191; 362/253; 33/520; 33/DIG. 21
(58) Field of Search .................. 362/109, 190, 362/191, 259, 253; 33/520, 542, 544.4, DIG. 21

(56) References Cited

U.S. PATENT DOCUMENTS

| | | |
|---|---|---|
| 4,968,147 A | 11/1990 | Shoemaker |
| 4,993,160 A | 2/1991 | Fraley |
| D347,018 S | 5/1994 | Jehn |
| 5,617,304 A | 4/1997 | Huang |
| 5,644,850 A | 7/1997 | Costales |
| 5,690,418 A * | 11/1997 | Hsiung ........................ 362/259 |
| 5,754,582 A | 5/1998 | Dong |
| 6,205,670 B1 * | 3/2001 | Webb ........................... 33/542 |

* cited by examiner

*Primary Examiner*—Stephen Husar

(57) ABSTRACT

A hole alignment device for aligning holes to be drilled in a joist. The hole alignment device includes a laser light emitter device. The laser emitter includes a first end, a second end and a peripheral wall extending therebetween. In an embodiment the laser emitter emits a laser light from the first end. The invention also includes a mounting member for removably mounting the laser emitter in the hole of a joist. The mounting member includes a first end, a second end and a peripheral wall extending therebetween. The first end includes a hole extending therein and extending through the second end. The laser emitter includes a size designed for removably positioning in the hole of the mounting member.

6 Claims, 3 Drawing Sheets

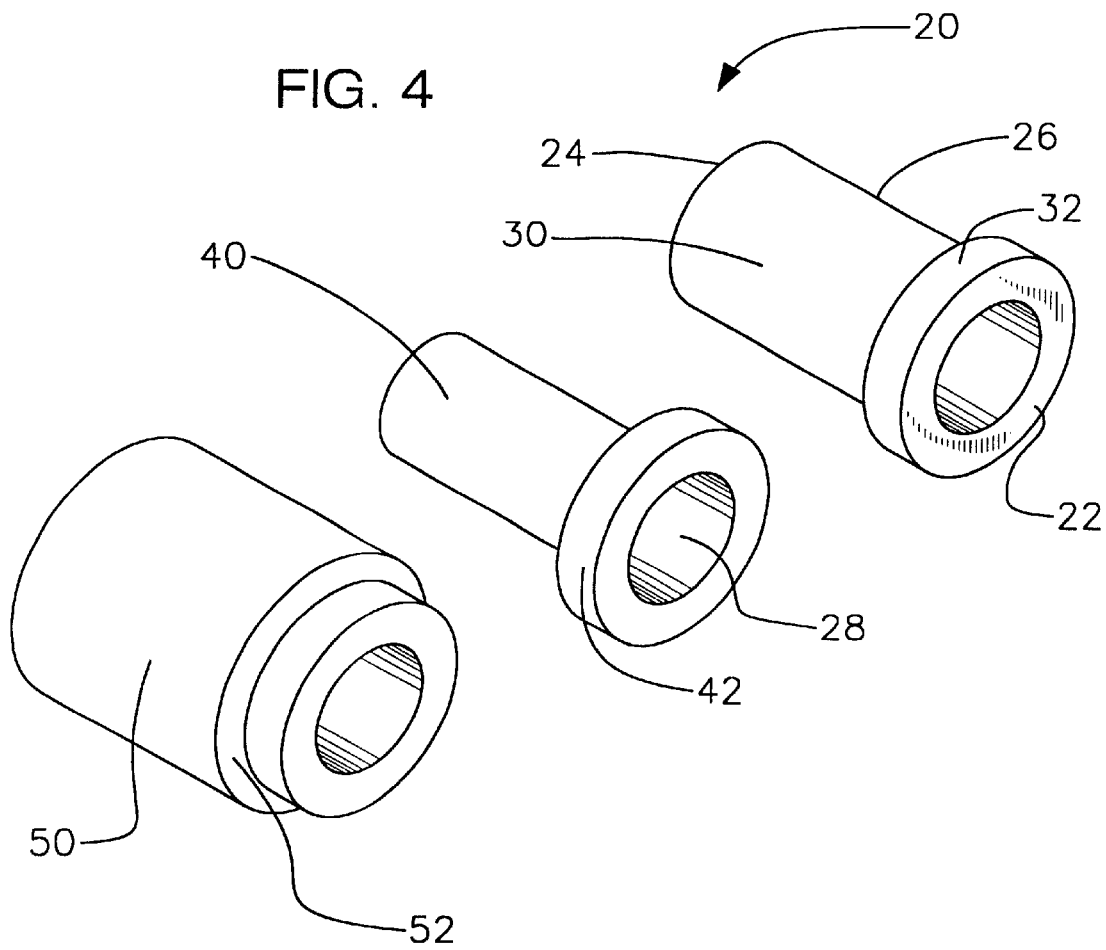

HOLE ALIGNMENT DEVICE

BACKGROUND OF THE INVENTION

1. Field of the Invention

The present invention relates to alignment devices and more particularly pertains to a new hole alignment device for aligning holes to be drilled in a joist.

2. Description of the Prior Art

The use of alignment devices is known in the prior art. More specifically, alignment devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,754,582; U.S. Pat. No. 4,968,147; U.S. Pat. No. 4,993,160; U.S. Pat. No. 5,617,304; U.S. Pat. No. 5,644,850; and U.S. Pat. No. Des. 347,018.

While these devices fulfill their respective, particular objectives and requirements, the aforementioned patents do not disclose a new hole alignment device. The inventive device includes a laser light emitter device. The laser emitter includes a first end, a second end and a peripheral wall extending therebetween. In an embodiment the laser emitter emits a laser light from the first end. The invention also includes a mounting member for removably mounting the laser emitter in the hole of a joist. The mounting member includes a first end, a second end and a peripheral wall extending therebetween. The first end includes a hole extending therein and extending through the second end. The laser emitter includes a size designed for removably positioning in the hole of the mounting member.

In these respects, the hole alignment device according to the present invention substantially departs from the conventional concepts and designs of the prior art, and in so doing provides an apparatus primarily developed for the purpose of aligning holes to be drilled in a joist.

SUMMARY OF THE INVENTION

In view of the foregoing disadvantages inherent in the known types of alignment devices now present in the prior art, the present invention provides a new hole alignment device construction wherein the same can be utilized for aligning holes to be drilled in a joist.

The general purpose of the present invention, which will be described subsequently in greater detail, is to provide a new hole alignment device apparatus and method which has many of the advantages of the alignment devices mentioned heretofore and many novel features that result in a new hole alignment device which is not anticipated, rendered obvious, suggested, or even implied by any of the prior art alignment devices, either alone or in any combination thereof.

To attain this, the present invention generally comprises a laser light emitter device. The laser emitter includes a first end, a second end and a peripheral wall extending therebetween. In an embodiment the laser emitter emits a laser light from the first end. The invention also includes a mounting member for removably mounting the laser emitter in the hole of a joist. The mounting member includes a first end, a second end and a peripheral wall extending therebetween. The first end includes a hole extending therein and extending through the second end. The laser emitter includes a size designed for removably positioning in the hole of the mounting member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new hole alignment device apparatus and method which has many of the advantages of the alignment devices mentioned heretofore and many novel features that result in a new hole alignment device which is not anticipated, rendered obvious, suggested, or even implied by any of the prior art alignment devices, either alone or in any combination thereof.

It is another object of the present invention to provide a new hole alignment device which may be easily and efficiently manufactured and marketed.

It is a further object of the present invention to provide a new hole alignment device which is of a durable and reliable construction.

An even further object of the present invention is to provide a new hole alignment device which is susceptible of a low cost of manufacture with regard to both materials and labor, and which accordingly is then susceptible of low prices of sale to the consuming public, thereby making such hole alignment device economically available to the buying public.

Still yet another object of the present invention is to provide a new hole alignment device which provides in the apparatuses and methods of the prior art some of the advantages thereof, while simultaneously overcoming some of the disadvantages normally associated therewith.

Still another object of the present invention is to provide a new hole alignment device for aligning holes to be drilled in a joist.

Yet another object of the present invention is to provide a new hole alignment device which includes a laser light emitter device. The laser emitter includes a first end, a second end and a peripheral wall extending therebetween. In an embodiment the laser emitter emits a laser light from the first end. The invention also includes a mounting member for removably mounting the laser emitter in the hole of a joist. The mounting member includes a first end, a second end and a peripheral wall extending therebetween. The first end includes a hole extending therein and extending through the second end. The laser emitter includes a size designed for removably positioning in the hole of the mounting member.

Still yet another object of the present invention is to provide a new hole alignment device that allows users to align a plurality of holes without having to repeatedly measure the placement of each hole.

Even still another object of the present invention is to provide a new hole alignment device that is easily carried and adaptable to being used in a plurality of hole sizes. Whereby, the present invention may be used for a wide variety of drilling projects.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a schematic perspective view of the present invention showing a plurality of different mounting members.

DESCRIPTION OF THE PREFERRED EMBODIMENT

Figure 1:
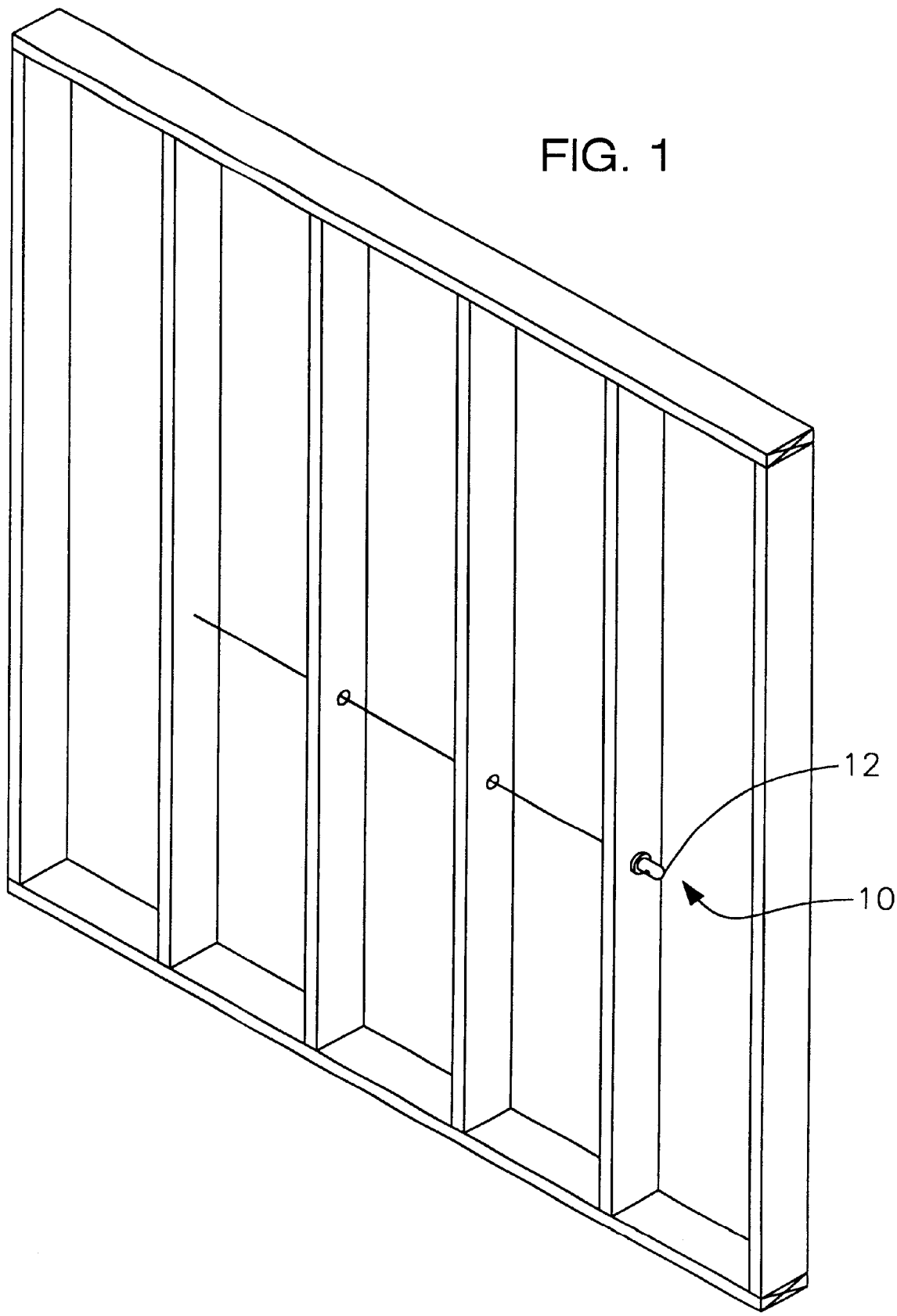
FIG. 1 is a schematic perspective view of a new hole alignment device according to the present invention.
Figure 2:
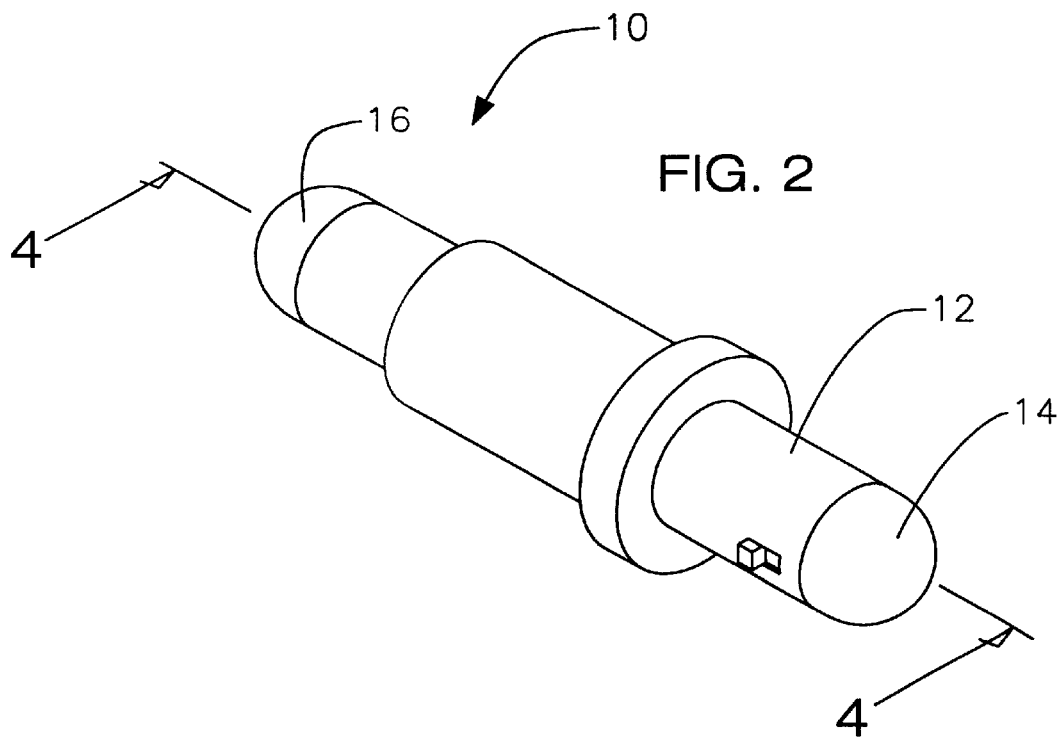
FIG. 2 is a schematic perspective view of the present invention.
Figure 3:
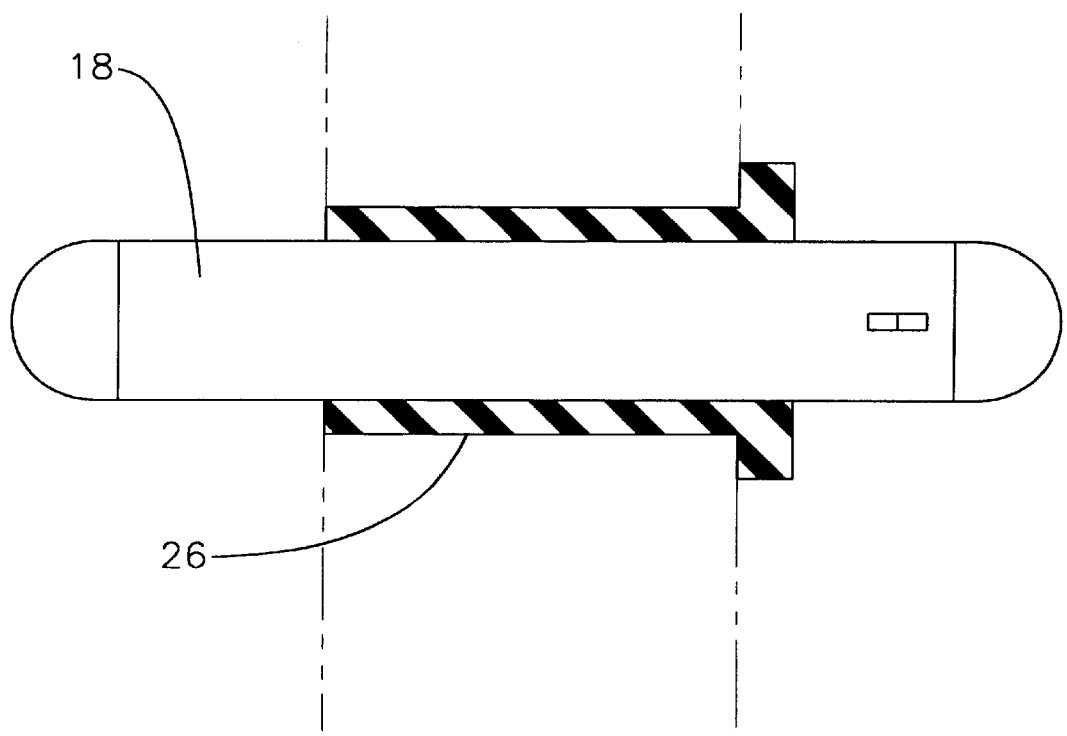
FIG. 3 is a schematic partial cross-sectional view of the present invention showing a laser emitter positioned a mounting member.

With reference now to the drawings, and in particular to FIGS. 1 through 4 thereof, a new hole alignment device embodying the principles and concepts of the present invention and generally designated by the reference numeral 10 will be described.

As best illustrated in FIGS. 1 through 4, the hole alignment device 10 generally comprises a laser light emitter device 12. The laser emitter 12 is elongated and includes a first end 14, a second end 16 and a peripheral wall 18 extending therebetween. In an embodiment the laser emitter 12 emits a laser light from the first end 14. The peripheral wall 18 includes an outer diameter. The laser emitter 12 is a conventional laser-pointing device.

The invention includes a plurality of mounting members 20 for releasably mounting the laser emitter 12 in the hole of a joist. Each of the mounting members 20 includes a first end 22, a second end 24 and a peripheral wall 26 extending therebetween. Each of the first ends 22 includes a hole 28 extending therein and extending through the second ends 24. The peripheral wall 26 of each of the mounting members 20 includes an inner diameter substantially equal to the outer diameter of the laser emitter.

In an embodiment the laser emitter 12 is removably positionable in one of the mounting members 20. The peripheral wall 26 of each of the mounting members 20 includes an outer diameter equal to a diameter of a hole drilled in a joist. In an embodiment each of the mounting members 20 is removably positionable in a hole in a joist.

A first mounting member 30 includes an annular flange 32 integrally coupled to and extending upwardly from the peripheral wall 26. The annular flange 32 is positioned generally adjacent to the first end 22 of the mounting member 20.

A second mounting member 40 includes an annular flange 42 integrally coupled to and extending upwardly from the peripheral wall 26 of the second mounting member 40, the annular flange 42 of the second mounting member 40 is positioned generally adjacent to the first end 22 of the second mounting member 40.

A third mounting member 50 includes a perimeter shoulder 50 therein. The perimeter shoulder 52 is positioned generally adjacent to the first end 22 of the third mounting member 50.

In use, the laser emitter 12 is positioned in one of the mounting members 20 depending on the hole drilled in the joist. The mounting member 20 is then placed in a hole in a joist. The different outer diameters of the peripheral walls 26 allow the laser emitter 12 to be used in a wide variety of holes. Once the mounting member 20 is placed in the hole the laser emitter 12 is then turned on to align where the next hole should be drilled.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hole alignment device, said device comprising:
   a laser light emitter device having a first end, a second end and a peripheral wall extending therebetween, wherein said laser emitter emits a laser light from said first end; and
   a mounting member for removably mounting said laser emitter in the hole of a joist, said mounting member having a first end, a second end and a peripheral wall extending therebetween, said first end having a hole extending therein and extending through said second end, said laser emitter having a size adapted for removably positioning in said hole of said mounting member.

2. The hole alignment device of claim 1, wherein said peripheral wall of said mounting member further comprises:

said peripheral wall of said mounting member having an inner diameter substantially equal to an outer diameter of said laser emitter, wherein said laser emitter is removably positionable in said mounting member, said peripheral wall of said mounting member having an outer diameter equal to a diameter of a hole drilled in a joist, wherein said mounting member is removably positionable in a hole in a joist.

3. The hole alignment device of claim 1, further comprising:

a first mounting member, said first mounting member having an annular flange, said annular flange being integrally coupled to and extending away from said peripheral wall, said annular flange being positioned generally adjacent to said first end.

4. The hole alignment device of claim 1, further comprising:

a second mounting member, said second mounting member having an annular flange, said annular flange of said second mounting member being integrally coupled to and extending away from said peripheral wall, said annular flange being positioned generally adjacent to said first end of said second mounting member.

5. The hole alignment device of claim 1, further comprising:

a third mounting member, said third mounting member having a perimeter shoulder therein, said perimeter shoulder being positioned generally adjacent to said first end of said third mounting member.

6. A hole alignment device, said device comprising:

a laser light emitter device, said laser emitter being elongated and having a first end, a second end and a peripheral wall extending therebetween, wherein said laser emitter emits a laser light from said first end, said peripheral wall having a outer diameter; and a plurality of mounting members for releasably mounting the laser emitter in the hole of a joist, each of said mounting members having a first end, a second end and a peripheral wall extending therebetween, each of said first ends having a hole extending therein and extending through said second ends, said peripheral wall of each of said mounting members having an inner diameter substantially equal to said outer diameter of said laser emitter, wherein said laser emitter is removably positionable in one of said mounting members, said peripheral wall of each of said mounting members having an outer diameter equal to a diameter of a hole drilled in a joist, wherein each of said mounting members are removably positionable in a hole in a joist, a first mounting member having an annular flange integrally coupled to and extending upwardly from said peripheral wall, said annular flange being positioned generally adjacent to said first end, a second mounting member having an annular flange integrally coupled to and extending upwardly from said peripheral wall of said second mounting member, said annular flange of said second mounting member being positioned generally adjacent to said first end of said second mounting member, a third mounting member having a perimeter shoulder therein, said perimeter shoulder being positioned generally adjacent to said first end of said third mounting member.

* * * * *